US009228915B2

(12) United States Patent
Grice

(10) Patent No.: US 9,228,915 B2
(45) Date of Patent: Jan. 5, 2016

(54) METHOD AND SYSTEM FOR DETECTING A FLOW BLOCKAGE IN A PIPE

(71) Applicant: ROLLS-ROYCE PLC, London (GB)

(72) Inventor: Christopher Michael Grice, Burton-on-Trent (GB)

(73) Assignee: ROLLS-ROYCE plc, London (GB)

(*) Notice: Subject to any disclaimer, the term of this patent is extended or adjusted under 35 U.S.C. 154(b) by 0 days.

(21) Appl. No.: 14/594,784

(22) Filed: Jan. 12, 2015

(65) Prior Publication Data

US 2015/0219516 A1 Aug. 6, 2015

(30) Foreign Application Priority Data

Feb. 5, 2014 (GB) .................................. 1401928.5

(51) Int. Cl.
| | | |
|---|---|---|
| F17D 3/01 | (2006.01) |
| F17D 5/00 | (2006.01) |
| G01L 19/08 | (2006.01) |
| G01L 19/12 | (2006.01) |
| F17D 3/00 | (2006.01) |
| F17D 3/18 | (2006.01) |
| F17D 5/02 | (2006.01) |

(52) U.S. Cl.
CPC ............... *G01L 19/083* (2013.01); *F17D 3/00* (2013.01); *F17D 3/01* (2013.01); *F17D 3/18* (2013.01); *F17D 5/00* (2013.01); *F17D 5/005* (2013.01); *F17D 5/02* (2013.01); *G01L 19/12* (2013.01); *F05D 2210/12* (2013.01); *F05D 2260/80* (2013.01); *F05D 2270/71* (2013.01); *F17C 2221/031* (2013.01); *F17C 2223/0123* (2013.01); *F17C 2250/043* (2013.01); *F17C 2250/0694* (2013.01); *F17C 2250/072* (2013.01); *F17C 2265/068* (2013.01)

(58) Field of Classification Search
CPC ........... G01L 19/083; F17D 5/00; F17D 5/02; F17D 3/00; F17D 3/01; F17D 3/18; F05D 2260/80
See application file for complete search history.

(56) References Cited

U.S. PATENT DOCUMENTS

2010/0173576 A1* 7/2010 Schmid .................. B64D 13/08
454/75
2011/0232369 A1* 9/2011 Tabaru ...................... G01N 3/32
73/37

FOREIGN PATENT DOCUMENTS

| CN | 202955483 U | 5/2013 |
| CN | 103277673 A | 9/2013 |
| DE | 3643378 A1 * | 6/1988 |
| RU | 2518781 C1 | 6/2014 |
| WO | WO2010/064629 * | 6/2010 |

OTHER PUBLICATIONS

Search Report issued in United Kingdom Application No. GB1401928.5 issued Aug. 15, 2014.

* cited by examiner

*Primary Examiner* — Michael J Zanellli
(74) *Attorney, Agent, or Firm* — Oliff PLC

(57) ABSTRACT

A method of detecting a flow blockage in a pipe includes: arranging a fluid flow along the pipe, the pipe in fluid communication with a pressure sensor; configuring the pressure sensor to measure a pressure within the pipe; recording plurality of measurements of pressure within the pipe; sampling 'n' successive values of pressure within the pipe; performing an analytical test on the 'n' successive values, the analytical test producing an output value, the output value representative of a variation in the individual ones of the 'n' successive values; comparing the output value to a pre-defined threshold value, the threshold value indicative of a lack of variation in the individual ones of the 'n' successive values; and if the output value is less than the threshold value, generating an alert to provide a user with an indication of the presence of flow blockage in the pipe.

17 Claims, 2 Drawing Sheets

METHOD AND SYSTEM FOR DETECTING A FLOW BLOCKAGE IN A PIPE

This invention claims the benefit of UK Patent Application No. 1401928.5, filed on 5 Feb. 2014, which is hereby incorporated herein in its entirety.

FIELD OF THE INVENTION

The present invention relates to a method of detecting a flow blockage in a pipe and particularly, but not exclusively, to a method of detecting a flow blockage in a gas pressure signal pipe.

BACKGROUND TO THE INVENTION

With reference to FIG. 1, a conventional high bypass ratio turbofan engine generally indicated at 10 has a principal and rotational axis 11. This turbofan engine comprises a three-shaft gas turbine engine having high, intermediate and low pressure spools. Such engines are typically provided with a single rotating stage in both the high and intermediate turbines. The low pressure turbine however, usually comprises many stages.

The engine 10 comprises, in axial flow series, an air intake 12, a propulsive fan 13, an intermediate pressure compressor 14, a high pressure compressor 15, combustion equipment 16, a high-pressure turbine 17, an intermediate pressure turbine 18, a low-pressure turbine 19 and a core engine exhaust nozzle 20. A nacelle 21 generally surrounds the engine 10 and defines the intake 12, a bypass duct 22 and a bypass exhaust nozzle 23. The fan 13 is circumferentially surrounded by a fan casing 30, which is supported by an annular array of outlet guide vanes 27.

The gas turbine engine 10 works in a conventional manner so that air entering the intake 11 is accelerated by the fan 13 to produce two air flows: a first air flow into the intermediate pressure compressor 14 and a second air flow which passes through a bypass duct 22 to provide propulsive thrust. The intermediate pressure compressor 14 compresses the air flow directed into it before delivering that air to the high pressure compressor 15 where further compression takes place. The compressed air exhausted from the high pressure compressor 15 is directed into the combustion equipment 16 where it is mixed with fuel and the mixture combusted. The resultant hot combustion products then expand through, and thereby drive the high, intermediate and low pressure turbines 17, 18, 19 before being exhausted through the nozzle 20 to provide additional propulsive thrust. The high, intermediate and low pressure turbines 17, 18, 19 respectively drive the high and intermediate pressure compressors 15, 14 and the fan 13 by interconnecting shafts 24, 25, 26 respectively thereby making up high, intermediate and low pressure spools.

Control of the gas turbine engine requires analysis of various data consisting of measured engine parameters converted into electrical signals by sensors sited on the engine. These parameters include shaft speeds, temperatures, pressures and fuel flow rate.

The measured pressures include the inlet pressure at the fan face ($P_{20}$), the pressure at the exit of the intermediate compressor ($P_{25}$), the high pressure compressor delivery pressure ($P_{30}$), the hot nozzle pressure ($P_{50}$), and the by-pass pressure ($P_{160}$). The location of each of these pressure variables within a typical three-shaft high bypass ratio turbofan engine is shown in FIG. 1.

Of these pressures, $P_{30}$ being the pressure at the exit from the high pressure compressor is the highest pressure in the engine. Due to the hostile environment at the exit from the high pressure compressor, the associated pressure sensor is remotely located with a pipe connecting it to the exit region.

The connecting pipe is known to fill with moist air and in icing conditions this can freeze such that the pipe is blocked. This has the effect of 'freezing' the static pressure measurement because all variation in the measured pressure ceases until the pipe unfreezes.

A known technique for detecting the freezing of the $P_{30}$ signal pipe relies on comparing a $P_{30}$ value modelled from other engine parameters (such as, for example, fuel flow rate or high pressure compressor delivery temperature) with the actual measured $P_{30}$ value. When a significant difference appears between the modelled and measured values then a freezing of the $P_{30}$ signal pipe may be indicated.

On detection of the freezing of the $P_{30}$ signal pipe, the control strategies of the engine change from using the measured $P_{30}$ value to using the modelled $P_{30}$ value.

In such circumstances, if there is little or no change in engine conditions (for example during cruise of the aircraft) then a $P_{30}$ pipe freeze event may remain undetected until the pilot requires a change in engine thrust. The frozen $P_{30}$ signal pipe may then cause the engine to produce an incorrect thrust level (i.e. higher or lower than requested) which would represent a safety risk during this critical event.

In effect, it is a dormant failure waiting for a demanded change in engine conditions to make it evident.

A disadvantage of the prior art system is that while it would detect the frozen $P_{30}$ signal pipe and activate a different control regime for the engine using the modelled $P_{30}$, there remains the possibility that a significantly incorrect thrust level may exist for a short period of time but at a potentially critical one.

A further disadvantage of the prior art system is that an error message, highlighting the frozen $P_{30}$ signal pipe, is provided to the pilot. This adds to the pilot's workload during a critical time and may distract the pilot from potentially more important issues.

STATEMENTS OF INVENTION

According to a first aspect of the present invention there is provided a method of detecting a flow blockage in a pipe, the method comprising the steps of:
(a) arranging a fluid flow along the pipe, the pipe being in fluid communication with a pressure sensor;
(b) configuring the pressure sensor to measure a pressure within the pipe;
(c) recording a plurality of measurements of the pressure within the pipe;
(d) sampling 'n' successive values of the pressure within the pipe;
(e) performing an analytical test on the 'n' successive values, the analytical test producing an output value, the output value being representative of a variation in the individual ones of the 'n' successive values;
(f) comparing the output value to a pre-defined threshold value, the threshold value being indicative of a lack of variation in the individual ones of the 'n' successive values; and
(g) if the output value is less than the threshold value, generating an alert to thereby provide a user with an indication of the presence of a flow blockage in the pipe.

In the method of the invention, the values of the pressure within the pipe are sampled with the variations between successive values being measured.

The normal $P_{30}$ sensor signal has small variations in the value with time during all flight conditions. Consequently, the lack of variation in this signal indicates that the pipe through which this pressure is measured has become blocked with ice.

The method of the invention provides a simple and robust technique for detecting the presence of the variations in the value of the $P_{30}$ sensor signal with time, which in turn allow an operator to readily detect a blockage in the $P_{30}$ sensor pipe.

The method and system of the invention enable a flow blockage of the $P_{30}$ sensor pipe to be detected within seconds rather than at the point at which the engine conditions changes. This enables the engine to be immediately and automatically switched into modelled $P_{30}$ mode. Thus any thrust anomalies would be avoided altogether and thus a potential safety issue removed. The pilot warning is given when he is otherwise unoccupied and does not add to his workload during an aircraft manoeuvre.

Optionally, the analytical test comprises the following steps:
(e1a) calculating the standard deviation of the 'n' successive values; and
(e2a) setting the output value of the analytical test to be the standard deviation of the 'n' successive values.

Optionally, the analytical test comprises the following steps:
(e1b) calculating a relative difference between each pair of successive ones of the 'n' successive values;
(e2b) for each of the 'n' successive values, calculating a sum of the (n−1) relative difference values; and
(e3b) setting the output value of the analytical test to be the sum of the (n−1) relative difference values.

Optionally, the analytical test comprises the following steps:
(e1c) performing a Fourier analysis on the 'n' successive values;
(e2c) for each sample of 'n' successive values recording the frequencies of any periodicity and their amplitudes; and
(e3c) setting the output value of the analytical test to be the amplitudes of the Fourier waveform analysis.

An advantage of using a standard statistical analysis test is that it is simple and straightforward to implement which makes the method efficient and convenient for a user.

Optionally, step (c) comprises recording a plurality of measurements of the pressure within the pipe at a rate of between approximately 1 Hz and 100 Hz.

Optionally, step (c) comprises recording a plurality of measurements of the pressure within the pipe at a rate of between approximately 10 Hz and 50 Hz.

Optionally, wherein step (c) comprises recording a plurality of measurements of the pressure within the pipe at a rate of approximately 20 Hz.

Optionally, step (d) comprises the step of:
(d1) sampling a rolling set of 'n' successive values of the pressure within the pipe.

According to a second aspect of the present invention there is provided a system for detecting a flow blockage in a pipe, the system comprising:
a pressure signal pipe;
a pressure sensor; and
a processor;
wherein the pressure sensor is in fluid communication with the pressure signal pipe, the pressure sensor being adapted to generate a plurality of output signal measurements indicative of the pressure within the pressure signal pipe,
the pressure sensor being further adapted to transmit the plurality of output signal measurements to the processor, the processor being adapted to carry out the method as claimed in any one of Claims 1 to 4.

An advantage of the system of the invention is that the data processing that is required by the method can readily be carried out by an existing electronic engine controller. This enables the method and system of the invention to be incorporated into an existing engine installation with no additional hardware and thus no added weight penalty. This makes the system and method of the invention more convenient and advantageous to a user.

Optionally, the plurality of output signal measurements is recorded at a rate of between approximately 1 Hz and 100 Hz.

Optionally, the plurality of output signal measurements is recorded at a rate of between approximately 10 Hz and 50 Hz.

Optionally, the plurality of output signal measurements is recorded at a rate of approximately 20 Hz.

Other aspects of the invention provide devices, methods and systems which include and/or implement some or all of the actions described herein. The illustrative aspects of the invention are designed to solve one or more of the problems herein described and/or one or more other problems not discussed.

BRIEF DESCRIPTION OF THE DRAWINGS

There now follows a description of an embodiment of the invention, by way of non-limiting example, with reference being made to the accompanying drawings in which.

It is noted that the drawings may not be to scale. The drawings are intended to depict only typical aspects of the invention, and therefore should not be considered as limiting the scope of the invention.

DETAILED DESCRIPTION

Figure 1:
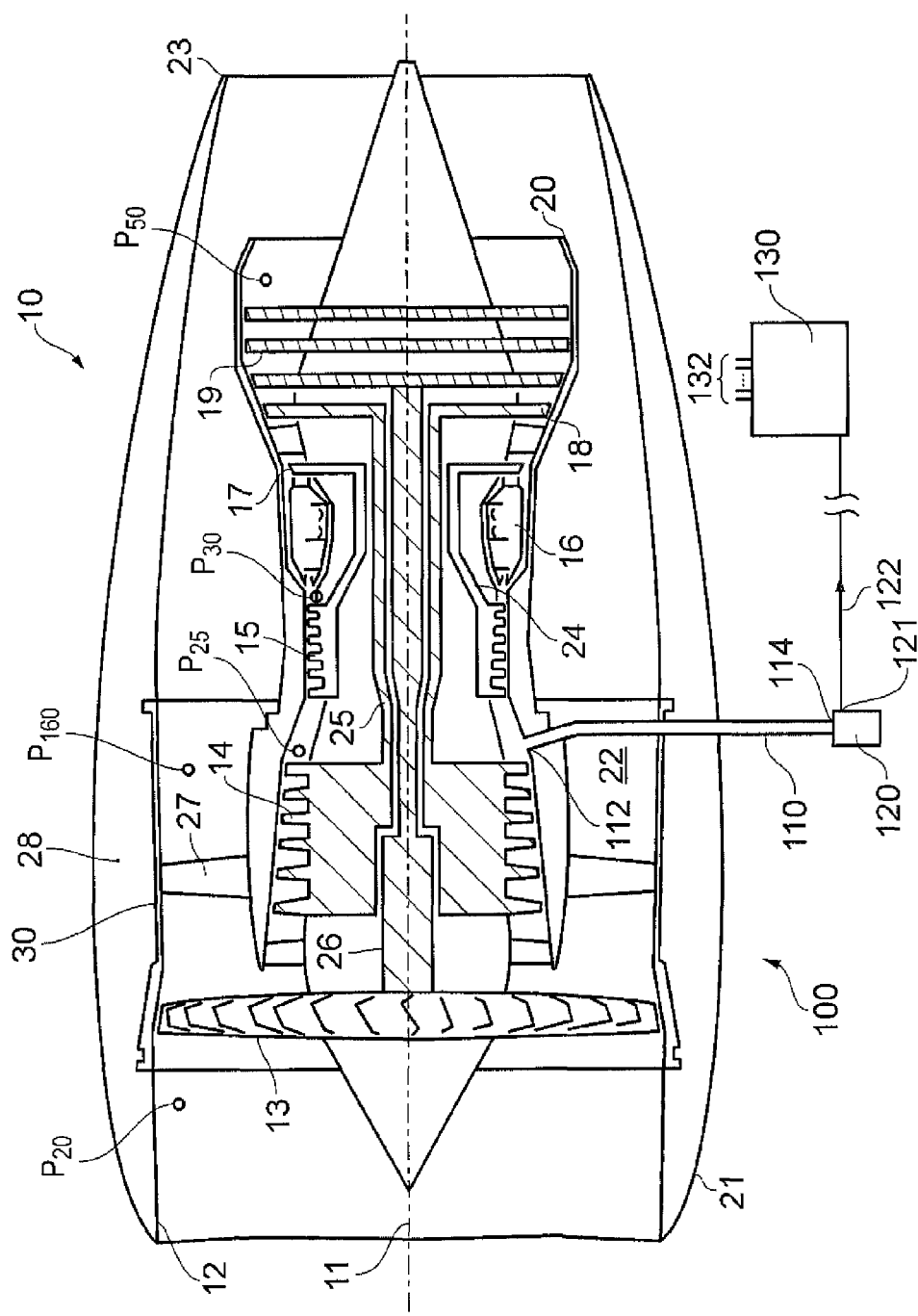
FIG. 1 shows a schematic sectional view of a turbofan engine according to the present invention.

Referring to FIG. 1, a system according to the invention is designated generally by the reference numeral 100.

The system 100 comprises a pressure signal pipe 110, a pressure sensor 120 and a processor 130. In the arrangement of FIG. 1, the system 100 is shown as part of a turbofan engine 10 for an aircraft application.

The pressure signal pipe 110 is connected at a first end 112 to the outlet of the high pressure compressor 15 of the gas turbine engine 10, and at a second end 114 to the pressure sensor 120. The pressure sensor 120 is thus in fluid communication with the outlet of the high pressure compressor 15 of the gas turbine engine 10 and corresponds to the $P_{30}$ signal pipe.

In the arrangement shown in FIG. 1 the pressure sensor 120 is shown as being situated external to the nacelle 21 of the engine 10. In alternative arrangements the pressure sensor 120 may be situated within the nacelle 21, for example within the void 28 created between the nacelle 21 and the fan casing 30.

The pressure sensor 120 may be any suitable pressure sensor, such as a piezoelectric sensor generating an electrical output 121.

The output 121 from the pressure sensor 120 is electrically connected to a processor 130 by a cable 122. In the arrangement shown in FIG. 1, the processor 130 is the original equipment Engine Control Unit for the engine 10. In alternative arrangements the processor 130 may be a separate unit from the original equipment Engine Control Unit for the engine 10.

Figure 2A:
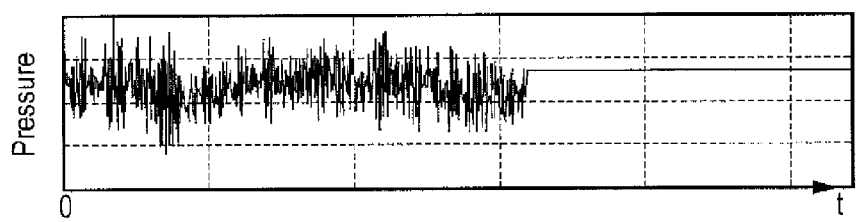
FIG. 2A shows a typical pressure signal from a $P_{30}$ pressure signal pipe embodied in the engine of FIG. 1.

In use, the processor 130 monitors the output 121 from the pressure sensor 120 and, in one arrangement of the method, samples the instantaneous value of this output signal 121 at a pre-determined sampling rate. FIG. 2A shows the raw data values corresponding to individual measurements of the output signal 121 from the pressure sensor 120 (i.e. the $P_{30}$ signal).

This sampled data is then recorded within the processor 120 in preparation for further data processing. In one arrangement of the method, the data is sampled at a frequency of approximately 20 kHz. In other arrangements, of the method this data may be sampled at a different sampling frequency, for example, between approximately 1 kHz and 100 kHz.

Figure 2B:
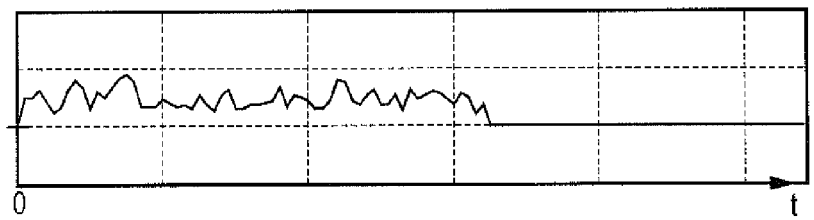
FIG. 2B shows the signal variation within the pressure signal of FIG. 2A.

The recorded data is then processed within the processor 120 by the application of a statistical test. In the present arrangement, a quantity 'n' (typically 10) of pressure measurement values is recorded. These 'n' measurements are then processed to determine the standard deviation for these 'n' measurements. FIG. 2B shows an example of the processed data.

The method is then repeated for the subsequent 'n' measurements of the pressure ($P_{30}$) signal.

Figure 2C:
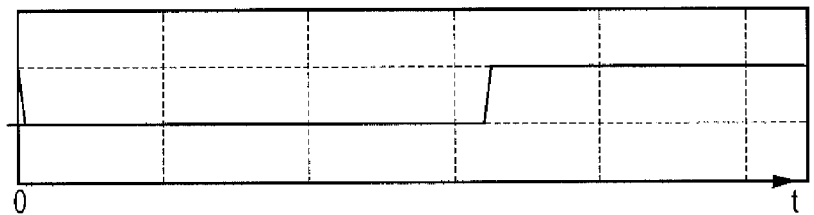
FIG. 2C shows a pipe freeze detection flag signal based on the pressure signal data of FIG. 2A.

If the standard deviation is less than a pre-defined threshold value this is indicative of the pressure ($P_{30}$) signal pipe 110 being frozen. In this circumstance, a flag is set within the processor 130 and an alert is sent to the engine operator (for example, the pilot) to highlight that the pressure ($P_{30}$) signal pipe 110 is frozen. FIG. 2C shows an example of the 'freeze detection' flag being set.

In addition to the alert being sent to the operator of the engine, the system may record a maintenance message in an event data log, which maintenance message will trigger a further alert for maintenance of the engine at the end of the routine operation of the engine.

In an alternative arrangement of the method, a different statistical test may be used. For example, a quantity 'n' (typically 10) of pressure measurements is recorded, with the positive differences between successive measurement values being recorded.

For example, the sequence of measurements that comprises 9, 10, 10, 11, 9, 10, 9, 8, 9, 9 would produce positive differences of 1, 0, 1, 2, 1, 1, 1, 1, 0. By summing these positive differences (in this example the sum is equal to 8) the method produces a measure of the variation between the successive values.

If the sum of the positive differences is less than a pre-defined threshold value this is indicative of the pressure ($P_{30}$) signal pipe 110 being frozen.

The method is then repeated for the subsequent 'n' measurements of the pressure ($P_{30}$) signal.

In a further alternative arrangement of the method, the processor 120 records 'n' measurements (typically 100) and performs Fourier analysis on this data. This analysis provides a measure of the frequencies of any periodicity and their amplitudes. The freeze condition is indicated if these amplitudes are below a set value. The processor 120 then repeats this process with the next 100 measurements.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person of skill in the art are included within the scope of the invention as defined by the accompanying claims.

What is claimed is:

1. A method of detecting a flow blockage in a pipe, the method comprising the steps of:
    (a) arranging a fluid flow along the pipe, the pipe being in fluid communication with a pressure sensor;
    (b) configuring the pressure sensor to measure a pressure within the pipe;
    (c) recording a plurality of measurements of the pressure within the pipe;
    (d) sampling 'n' successive values of the pressure within the pipe;
    (e) performing an analytical test on the 'n' successive values, the analytical test producing an output value, the output value being representative of a variation in the individual ones of the 'n' successive values;
    (f) comparing the output value to a pre-defined threshold value, the threshold value being indicative of a lack of variation in the individual ones of the 'n' successive values; and
    (g) if the output value is less than the threshold value, generating an alert to thereby provide a user with an indication of the presence of a flow blockage in the pipe.

2. The method as claimed in claim 1, wherein the analytical test comprises the following steps:
    (e1a) calculating the standard deviation of the 'n' successive values; and
    (e2a) setting the output value of the analytical test to be the standard deviation of the 'n' successive values.

3. The method as claimed in claim 1, wherein the analytical test comprises the following steps:
    (e1b) calculating a relative difference between each pair of successive ones of the 'n' successive values;
    (e2b) for each of the 'n' successive values, calculating a sum of the (n−1) relative difference values; and
    (e3b) setting the output value of the analytical test to be the sum of the (n−1) relative difference values.

4. The method as claimed in claim 1, wherein the analytical test comprises the following steps:
    (e1c) performing a Fourier analysis on the 'n' successive values;
    (e2c) for each sample of 'n' successive values recording the frequencies of any periodicity and their amplitudes; and
    (e3c) setting the output value of the analytical test to be the amplitudes of the Fourier waveform analysis.

5. The method as claimed in claim 1, wherein step (c) comprises recording a plurality of measurements of the pressure within the pipe at a rate of between approximately 1 Hz and 100 Hz.

6. The method as claimed in claim 5, wherein step (c) comprises recording a plurality of measurements of the pressure within the pipe at a rate of between approximately 10 Hz and 50 Hz.

7. The method as claimed in claim 6 wherein step (c) comprises recording a plurality of measurements of the pressure within the pipe at a rate of approximately 20 Hz.

8. The method as claimed in claim 5, wherein step (c) comprises recording a plurality of measurements of the pressure within the pipe at a rate of approximately 20 Hz.

9. The method as claimed in claim 1, wherein step (d) comprises the step of:
    (d1) sampling a rolling set of 'n' successive values of the pressure within the pipe.

10. A system for detecting a flow blockage in a pipe, the system comprising:
- a pressure signal pipe;
- a pressure sensor; and
- a processor;
- wherein the pressure sensor is in fluid communication with the pressure signal pipe, the pressure sensor being adapted to generate a plurality of output signal measurements indicative of the pressure within the pressure signal pipe,
- the pressure sensor being further adapted to transmit the plurality of output signal measurements to the processor, the processor being adapted to carry out the method as claimed in claim 1.

11. The system as claimed in claim 10, wherein the plurality of output signal measurements is recorded at a rate of between approximately 1 Hz and 100 Hz.

12. The system as claimed in claim 11, wherein the plurality of output signal measurements is recorded at a rate of between approximately 10 Hz and 50 Hz.

13. The system as claimed in claim 12, wherein the plurality of output signal measurements is recorded at a rate of approximately 20 Hz.

14. The system as claimed in claim 11, wherein the plurality of output signal measurements is recorded at a rate of approximately 20 Hz.

15. A system for detecting a flow blockage in a pipe, the system comprising:
- a pressure signal pipe;
- a pressure sensor; and
- a processor;
- wherein the pressure sensor is in fluid communication with the pressure signal pipe, the pressure sensor being adapted to generate a plurality of output signal measurements indicative of the pressure within the pressure signal pipe,
- the pressure sensor being further adapted to transmit the plurality of output signal measurements to the processor, the processor being adapted to carry out the method as claimed in claim 2.

16. A system for detecting a flow blockage in a pipe, the system comprising:
- a pressure signal pipe;
- a pressure sensor; and
- a processor;
- wherein the pressure sensor is in fluid communication with the pressure signal pipe, the pressure sensor being adapted to generate a plurality of output signal measurements indicative of the pressure within the pressure signal pipe,
- the pressure sensor being further adapted to transmit the plurality of output signal measurements to the processor, the processor being adapted to carry out the method as claimed in claim 3.

17. A system for detecting a flow blockage in a pipe, the system comprising:
- a pressure signal pipe;
- a pressure sensor; and
- a processor;
- wherein the pressure sensor is in fluid communication with the pressure signal pipe, the pressure sensor being adapted to generate a plurality of output signal measurements indicative of the pressure within the pressure signal pipe,
- the pressure sensor being further adapted to transmit the plurality of output signal measurements to the processor, the processor being adapted to carry out the method as claimed in claim 4.

\* \* \* \* \*